July 15, 1941.  W. C. WAGNER ET AL  2,249,068
PRECISION-CALIBRATING DEVICE WITH POINTER
Filed March 8, 1939
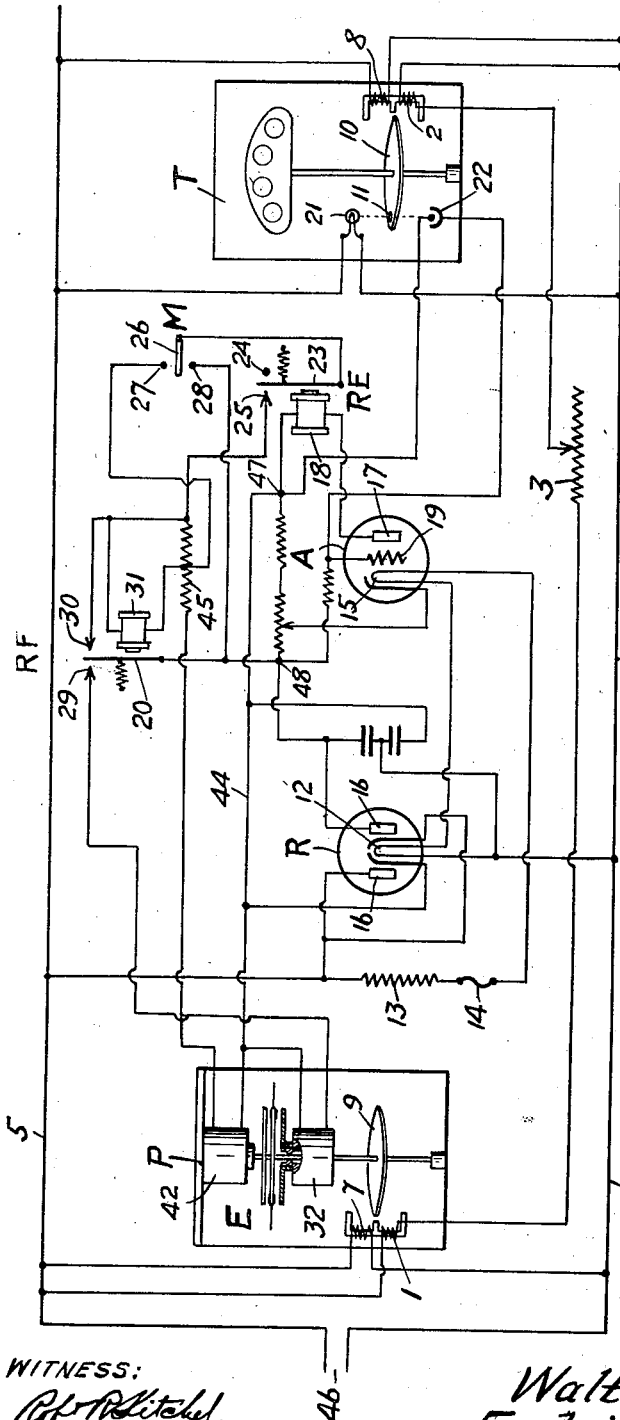
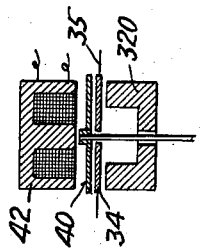
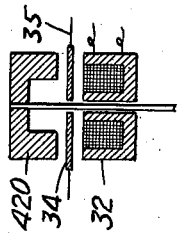
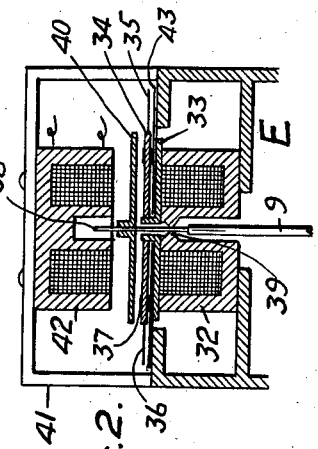
WITNESS:
INVENTORS
Walter C. Wagner
Frederick Strattner
BY
Augustus B. Stoughton
ATTORNEY Patented July 15, 1941

2,249,068

UNITED STATES PATENT OFFICE 2,249,068

PRECISION-CALIBRATING DEVICE WITH POINTER

Walter C. Wagner, Ardmore, and Frederick Strattner, Upper Darby, Pa.

Application March 8, 1939, Serial No. 260,550

8 Claims. (Cl. 175—183)

An object of our invention is to provide a precision-calibrating device for comparing the relative speeds of two moving objects.

More specifically, our invention relates to means for testing watthour meters by comparing them with a standard meter, there being provided on the standard meter a pointer adapted to be connected to the standard meter and rotated thereby for any number of revolutions of the meter to be tested and to be then stopped instantaneously on the completion of this number of revolutions. By means of a scale on the standard meter over which the pointer rotates, it can be observed whether or not the standard meter has made the same number of revolutions as the meter being tested.

One embodiment of our invention comprises, means for testing an electric watthour meter by comparing it with a standard meter comprising a meter to be tested, a source of light mounted adjacent said meter, a light-sensitive element mounted adjacent said meter and arranged to receive light from said source subject to the influence of a rotating part of said meter which may partially or completely cut off the light from said source or may reflect it, a standard meter having a rotating element, a pointer mounted on said standard meter, and an electromagnetically operated device arranged to connect and disconnect said pointer to said rotating element of said standard meter in response to the variations of said light-sensitive element caused by the rotation of the meter to be tested.

A further object of our invention is to provide in such a means a manually operable switch whereby the switch may be operated to one position whereupon the testing starts at the next passage of a light-influencing element in the meter being tested between the light source and the light sensitive element and continues until the manually operable switch is again operated, whereupon the test concludes on the next passage of the light-influencing element. The beginning and ending of the test is thus eliminated from the control of the operator, whereby the personal equation of the operator is eliminated.

For a further exposition of our invention, reference may be had to the annexed drawing and specification at the end thereof our invention will be specifically pointed out and claimed.

In the drawing:

Fig. 1 is a diagram of one form of our device.

Fig. 2 is a detailed view, in vertical cross-section, of a portion of the device shown in Fig. 1.

Figs. 3 and 4 are diagrammatic views, in vertical cross-section, of modifications of the standard meter which forms part of our device.

In that embodiment of our invention chosen from among others for illustration in the drawing and description in the specification, our device is shown as consisting of a precision standard meter P and a meter to be tested T. The current coils 1 and 2 of meters P and T, respectively, are connected in series with a variable resistor 3 across leads 5 and 6 of an alternating current circuit. Potential coils 7 and 8 of meters P and T, respectively, are connected across the leads 5 and 6. Meters P and T each has a rotating element 9 and 10, respectively. On rotating element 10 of meter T there is provided a light-influencing element 11 shown as one of the creep holes customarily found in meters of this type. However, light-influencing element may be any means for completely or partially cutting off a beam of light or for reflecting it.

A rectifying device R has a filament 12 connected in series with the resistor 13, fuse 14, and filament 15 of an amplifying device A across leads 5 and 6. Rectifier R is a full-wave rectifier having the cathode filament 12 indirectly heated and having plates 16.

Amplifier A is also of the indirectly-heated cathode type having a plate 17 connected to one side of the coil 18 of a relay RE and a grid 19 connected to the blade 20 of another relay RF.

Adjacent meter T which is to be tested there is provided a light source 21 connected directly across leads 5 and 6, and a light-sensitive element 22, such as a photoelectric cell or the like, connected across the grid 19 so as to vary the output from amplifier A. Light source 21 and light-sensitive element 22 may either or both be provided with a suitable optical system for condensing or concentrating the light.

Again relay RE is provided with a blade 23 biased to open position against stop 24 and adapted, when attracted by coil 18, to close circuit with stationary contact 25. Blade 23 is connected to the blade 26 of a double-throw, manually operable switch M having stationary contacts 27 and 28. Contact 28 is connected to blade 20 of relay RF. Blade 20 is biased into contact with stationary contact 29 and is adapted to close circuit with stationary contact 30 when attracted by coil 31 one end of which is connected to contacts 25 and 30.

Electromagnetically operated device E forms a part of meter P and consists, as is best seen in Fig. 2, of a holding magnet 32 forming a stationary part of the meter P. On the holding magnet 32 there is mounted a disk 33 of bronze or like non-magnetic material having an upwardly projecting collar on which is guided the pointer which consists of an armature disk 34 having pointer 35 projecting therefrom and diametrically opposite a counter-balance 36. Disk 34 also has clutch-facings 37 thereon. Rotating element 9 and meter P includes a shaft having at its upper end a needle 38 which is carried in a bearing 39 forming part of the holding magnet 32. Fast on needle 38 is a rotating disk 40 of bronze or like non-magnetic material. On a support 41 on meter P there is mounted a connecting magnet 42 which, when energized, serves to attract disk 34 into contact with rotating disk 40 so that pointer 35 rotates with rotating element 9. Meter P may, if desired, carry a chart or dial 43 past which pointer 35 rotates and which carries suitable indicia for indicating the movement of pointer 35. Chart 43 may be manually rotated relative to meter P so that it may be re-set to zero position at the end of each test so that in each new test pointer 35 can start from zero positon. Holding magnet 32 is connected across the common lead 44 for the magnets and stationary contact 29 of relay RF. Connecting magnet 42 is connected across the common lead 44 and coil 31 of relay RF, and through resistor 45 with stationary contacts 25 and 30. There may, if desired, be provided a connecting plug 46 for the leads 5—6, which is particularly useful when the device is wired as a portable set for testing meters on customers' premises.

The operation of our device is as follows: When it is desired to test a meter T, light source 21 is mounted adjacent the rotating part of the meter, and the light-sensitive element 22 is mounted so as to receive a beam of light from source 21 subject to the influence of the rotating part of meter T. Plug 46 is connected to the line and resistor 3 adjusted so that the meters P and T are rotating at the desired speed. Holding magnet 32 is energized because current flows from junction 47 which forms one side of the output from rectifier R through common lead 44, electromagnet 32, contact 29 and blade 20, back to junction 48 which forms the other output terminal of rectifier R. When it is desired to start the test, manually operable switch M is moved to close contacts 26 and 28. On the next impulse caused by light-influencing element 11, light-sensitive element 22 causes relay RE to operate so that coil 18 closes contacts 23 and 25 and thereby holding-relay RF is actuated, coil 31 attracting blade 20 against its bias out of contact with contact 29 and into engagement with contact 30. This movement of blade 20 de-energizes holding electro-magnet 32 and energizes connecting electro-magnet 42. The circuit through magnet 42 is as follows: from junction 47, through lead 44, electro-magnet 42, a portion of resistor 45, coil 31, contact 25, blade 23, blade 26 and contact 28, back to junction 48. The establishment of contact between blade 20 and stationary contact 30 causes a direct connection between coil 31 and junction 48 so that contacts 20 and 30 are held in engagement by coil 31 even after relay RE breaks contact between 23 and 25. When the desired number of rotations of part 10 of meter T are observed by the person making the test to be about to be completed, switch M is operated to break contacts 26 and 28 and to close contacts 26—27. The next time light-influencing element 11 actuates light-sensitive element 22 and thereby causes RE to close contacts 23 and 25, coil 31 of relay RF is de-energized because it is short-circuited and blade 20 returns under its bias into contact with contact 29. Connecting magnet 42 is de-energized and holding magnet 32 is energized, thereby instantaneously stopping pointer 35 by attracting disk 34 against stationary collar 33 so that clutch-facings 37 cause an instantaneous stop of the pointer. If pointer 35 is opposite the zero mark on chart 43, the meters P and T have made the same number of revolutions. If pointer 35 is not opposite the zero mark, the amount of variation from the zero mark can be observed and also the relative speeds of meters P and T. If desired, chart 43 may then be manually moved so that the zero mark lies under pointer 35 so that meter P is ready for the next test.

As is seen in Fig. 3, our device may be modified by using an electro-magnet 32 as the holding magnet but, by substituting a permanent magnet 420 for the connecting magnet. The flux of electro-magnet 32 when energized is sufficient to overcome the flux of permanent magnet 420 and to thus instantaneously attract disk 34 and thereby stop pointer 35.

As shown in Fig. 4, a permanent magnet 320 may be substituted for the holding magnet while electro-magnet 42 is employed as the connecting magnet. Electro-magnet 42 is strong enough when energized to overcome the flux of permanent magnet 320 and to attract disk 34 into contact with rotating disk 40 so that pointer 35 is rotated until electro-magnet 42 is de-energized, when permanent magnet 320 again attracts disk 34 away from rotating disk 40 and instantaneously stops the movement of pointer 35. The connections of the modification shown in Figs. 3 and 4 into the circuit shown in Fig. 1 are obvious, the electro-magnet occupying the position of the electro-magnet shown in Fig. 1, while the opposite electro-magnet shown in Fig. 1 is omitted and a permanent magnet substituted therefor.

In the foregoing, meters P and T have been described as having the same watthour-per-disk-revolution constant, but it is to be understood that the method applies with equal effectiveness when these constants differ, the movement of pointer 35 being proportionately greater or less than a complete revolution for one revolution of element 10 when meter T is without error.

Although the embodiment which has been illustrated and described refers to the testing of electric watthour meters, our invention in its broader aspect includes the comparison of relative degree of movement in a given interval or speed of any bodies, devices or elements having a repeating cycle of movements.

It is to be understood that the meter P may be used in a manually-controlled system without the light sensitive element 22 or its associated equipment including the light source 21, amplifier A, relay RE and manually operable switch M, to replace the ordinary standard test meter. In such case the test is made with the rotating elements 9 and 10 in continuous rotation. At the desired instant of start of test the meter tester manually operates the blade 20, moving it so that it disengages from contact 29 and engages with contact 30, and holds it in that position until the instant of desired end of test, when he releases it. The pointer 35 is held in stopped position by holding magnet 32 until the blade 20 is moved from contact 29 to contact 30 whereupon the pointer 35 is released by holding magnet 32 and is attracted by connecting magnet 42 and thereby caused to revolve with rotating element 9 until blade 20 is released from contact 30 into engagement with contact 29. The connecting magnet is thereby de-energized and the holding magnet brings the rotating element 9 instantly to rest. In place of the relay RF it is obvious that an ordinary single pole double-throw manual switch may be used with the movable blade corresponding to blade 20 and the two contacts of said switch corresponding to the contacts 29 and 30. Our standard meter P has the advantage over the customary standard meters for this application in that there is a complete elimination of gears and an almost complete elimination of inertia effects. The light-weight pointer is stopped and started in place of starting and stopping the entire element 9, thereby virtually eliminating the starting and stopping inertia and starting and rotating friction. The result is a considerable increase in precision of our standard meter over the ordinary standard meter.

The meter P may also be used in place of the ordinary standard test meter by eliminating the holding magnet 32 and connecting magnet 42 and associated equipment and merely affixing the pointer 35 to rotating element 9 so that it rotates therewith. In this modification the meter P is operated in the customary manner by energizing its potential coil circuit only for the desired interval of test, the element 10 of meter T being in continuous rotation. This meter has the advantage over the ordinary standard test meter operated in the same manner in that complete elimination of gears greatly reduces starting and rotating friction and minimizes inertia errors by decreasing the mass of rotating parts. A considerable increase in precision is obtainable with this modification of our meter than with the ordinary standard meter, making feasible a shorter testing interval.

We do not intend to be limited save as the scope of the prior art and of the attached claims.

We claim:

1. Means for testing an electric watthour meter by comparing it with a standard meter, comprising, a watthour meter to be tested, a source of light mounted adjacent said meter, a light-sensitive element mounted adjacent said meter and arranged to receive light from said source subject to the influence of a rotating part of said meter, a standard electric watthour meter having a rotating element, a pointer mounted on said standard meter, and a pair of magnets whose magnetic effects on said pointer oppose each other to connect and disconnect said pointer and a rotating part of said standard meter, one of said magnets being under the control of said light-sensitive element in response to the variations of said light-sensitive element caused by the movement of the rotating part of the meter to be tested.

2. Means for testing an electric watthour meter by comparing it with a standard meter, comprising, a watt-hour meter to be tested, a source of light mounted adjacent said meter, a light-sensitive element mounted adjacent said meter and arranged to receive light from said source subject to the influence of a rotating part of said meter, a standard electric watthour meter having a rotating shaft, a pointer mounted on said standard meter, a stationary device for connecting said pointer to said shaft for rotation with said shaft, and means for stopping said pointer and holding it in stopped position immediately upon disconnection of said pointer from said shaft.

3. Means for testing an electric watthour meter by comparing it with a standard meter, comprising, a watt-hour meter to be tested, a source of light mounted adjacent said meter, a light-sensitive element mounted adjacent said meter and arranged to receive light from said source subject to the influence of a rotating part of said meter, a standard electric watthour meter having a rotating shaft, a pointer mounted on said standard meter, and an electro-magnet forming a stationary part of said standard meter and mounted adjacent said shaft and located above said pointer and arranged so that, when said electro-magnet is energized, said pointer is lifted and rotates with said shaft, and, when said electro-magnet is de-energized, said pointer falls and is held in stopped position.

4. Means for testing an electric watthour meter by comparing it with a standard meter, comprising, a watthour meter to be tested, a source of light mounted adjacent said meter, a light-sensitive element mounted adjacent said meter and arranged to receive light from said source subject to the influence of a rotating part of said meter, a standard electric watthour meter having a rotating element, a pointer mounted on said standard meter, means for connecting said pointer to said shaft for rotation with said shaft, a magnet mounted adjacent said shaft but spaced therefrom and adapted to hold said pointer against rotation, and a second magnet mounted adjacent said shaft and said first-mentioned magnet and having its magnetic flux through said pointer in opposition to the flux of said first-mentioned magnet, and a non-magnetic disk rotatable with said shaft and interposed between said pointer and said second magnet so that, when said second magnet is energized, said pointer is connected to said shaft for rotation therewith.

5. Means for testing an electric watthour meter by comparing it with a standard meter, comprising, a watthour meter to be tested, a source of light mounted adjacent said meter, a light-sensitive element mounted adjacent said meter and arranged to receive light from said source subject to the influence of a rotating part of said meter, a standard electric watthour meter having a rotating element, a pointer mounted on said standard meter, an electro-magnetically operated device arranged to connect and disconnect said pointer to said rotating element of said standard meter; and a holding relay connected in series with said device and arranged to connect said device in connecting condition in one position and in disconnecting condition in the other position.

6. Means for testing an electric watthour meter by comparing it with a standard meter, comprising, a watthour meter to be tested, a source of light mounted adjacent said meter, a light-sensitive element mounted adjacent said meter and arranged to receive light from said source subject to the influence of a rotating part of said meter, a standard electric watthour meter having a rotating element, a pointer mounted on said standard meter, an electro-magnetically operated device arranged to connect and disconnect said pointer to said rotating element of said standard meter, a holding relay connected in series with said device to connect said device in connecting condition in one position of said holding relay and to connect said device in disconnecting condition in the other position of said holding relay, a second relay arranged for actuation under the control of said light-sensitive element, and a manually operable switch having connections adapted to connect said second relay and said holding relay and said device in series in one position of said manually operable switch and to connect said second relay and said device in series, short-circuiting said holding relay in the other position of said manually operable switch.

7. Means for testing an electric watthour meter by comparing it with a standard meter, comprising, a watthour meter to be tested, a source of light mounted adjacent said meter, a light-sensitive element mounted adjacent said meter and arranged to receive light from said source subject to the influence of a rotating part of said meter, a standard electric watthour meter having a rotating element, a pointer mounted on said standard meter, a holding electro-magnet located adjacent said standard meter and said pointer and arranged, when energized, to disconnect said pointer from said rotating element of said standard meter, a connecting electro-magnet mounted adjacent said standard meter and said pointer and arranged, when energized, to connect said pointer and said rotating element of said standard meter, a holding relay having two stationary contacts and a coil, one of said contacts toward which said holding relay is biased being connected in series with said holding electro-magnet across the line, a second relay arranged to be closed when said light-sensitive element is energized by the rotation of the meter to be tested, and a manually operable switch having two stationary contacts, one of said stationary contacts being arranged to connect said second relay and said holding relay and said connecting electro-magnet in series across the line, whereby the coil of said holding relay is energized and opens one contact and disconnects said holding electro-magnet and closes the other contact and connects said connecting electro-magnet across the line, said second contact of said manually operable switch being arranged to connect said second relay and said connecting electro-magnet in series across the line through said other of the stationary contacts of said holding relay but short-circuiting the coil thereof so that said holding relay breaks said other contact and closes said first-mentioned contact.

8. Means for comparing the speeds of a commercial meter to be tested and a standard meter while said meters are rotating at their normal speeds comprising, in combination, a source of electricity, a commercial meter to be tested, a standard meter connected with said commercial meter across said source, a pointer mounted on said standard meter so as to be disconnected therefrom and so as to be connected thereto to be rotated in synchronism therewith, and an electro-magnetically operated device, having as part thereof a coil forming a stationary part of said standard meter and connected under the control of said commercial meter to connect and disconnect said pointer and said standard meter in synchronism with one or more revolutions of the commercial meter.

WALTER C. WAGNER.
FREDERICK STRATTNER.